(12) United States Patent
Jimison et al.

(10) Patent No.: US 6,406,049 B1
(45) Date of Patent: Jun. 18, 2002

(54) AMUSEMENT AND ALERT ACCESSORY FOR BICYCLES

(76) Inventors: James W. Jimison, 360 Fulton St., Palo Alto, CA (US) 94301; Ronald L. Coleman, 2831 61$^{st}$ Ave., Oakland, CA (US) 94605

( * ) Notice: Subject to any disclaimer, the term of this patent is extended or adjusted under 35 U.S.C. 154(b) by 0 days.

(21) Appl. No.: 09/314,454

(22) Filed: May 18, 1999

Related U.S. Application Data

(60) Provisional application No. 60/085,959, filed on May 19, 1998.

(51) Int. Cl.$^7$ .................................................. B62J 3/00
(52) U.S. Cl. ..................... 280/288.4; 116/56; 280/1.14; 340/384.5; 340/432; 446/404
(58) Field of Search ............................ 280/288.4, 1.14; 446/270, 271, 413, 414, 404, 408; 84/404; 472/64; 340/432, 384.5; 369/31, 21, 63, 64; 116/56, 61

(56) References Cited

U.S. PATENT DOCUMENTS

| | | | | |
|---|---|---|---|---|
| 4,151,677 A | * | 5/1979 | Tucker | 116/56 |
| 4,434,801 A | * | 3/1984 | Jiminez et al. | 128/689 |
| 4,964,837 A | * | 10/1990 | Collier | 446/409 |
| 5,130,693 A | * | 7/1992 | Gigandet | 340/326 |
| 5,820,442 A | * | 10/1998 | Helder | 446/404 |

* cited by examiner

Primary Examiner—Anne Marie Boehler

(57) ABSTRACT

An accessory which produces distinct sounds in order to alert others of the presence of a bicycle. The accessory is formed of a housing, sound producing assemblies, and a mounting system. The mounting assembly may be clamped around left or right members of bicycle forks, frame, stays, or braces. Housing of the accessory will accommodate mechanical or electronic sound producing elements which are interchangeable and may be used individually or in combination. When installed and the bicycle is in motion, a variety of sounds may be produced depending on the configuration of the sound producing components.

18 Claims, 13 Drawing Sheets

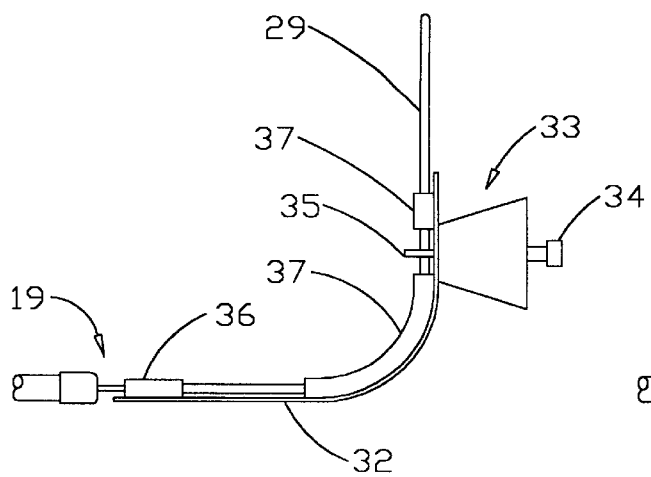
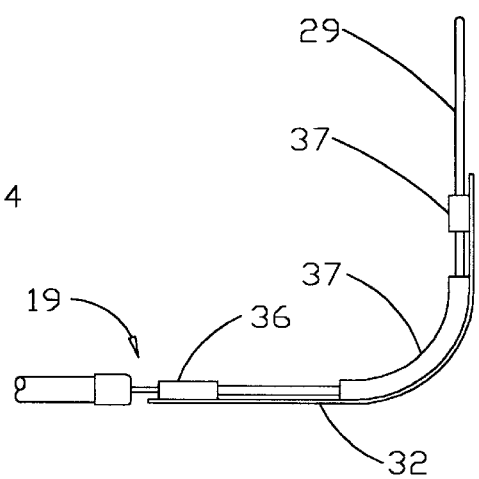
FIG. 5A
FIG. 5B
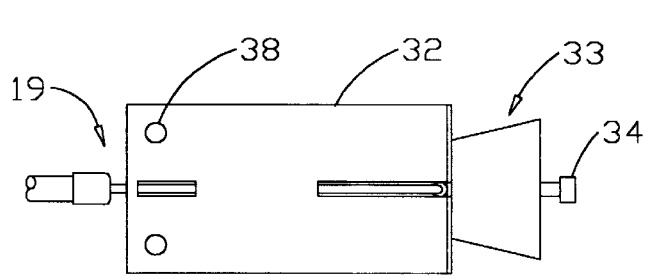
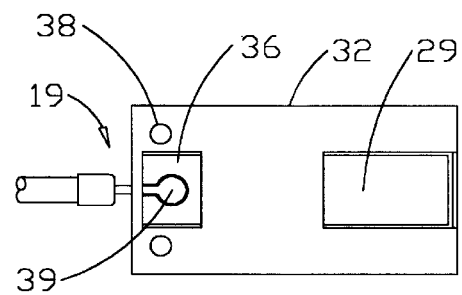
FIG. 6A
FIG. 6B
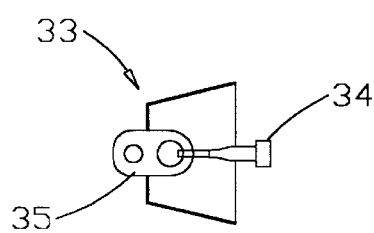
FIG. 6C

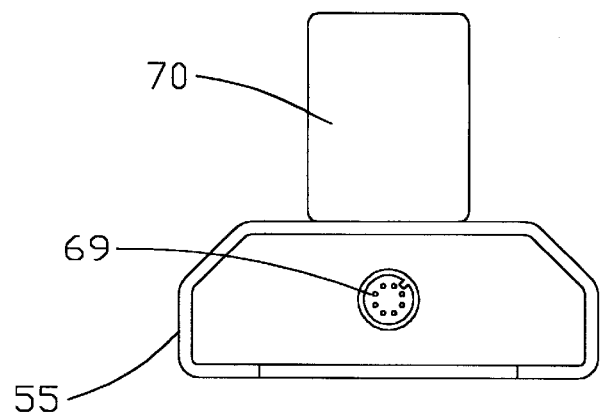
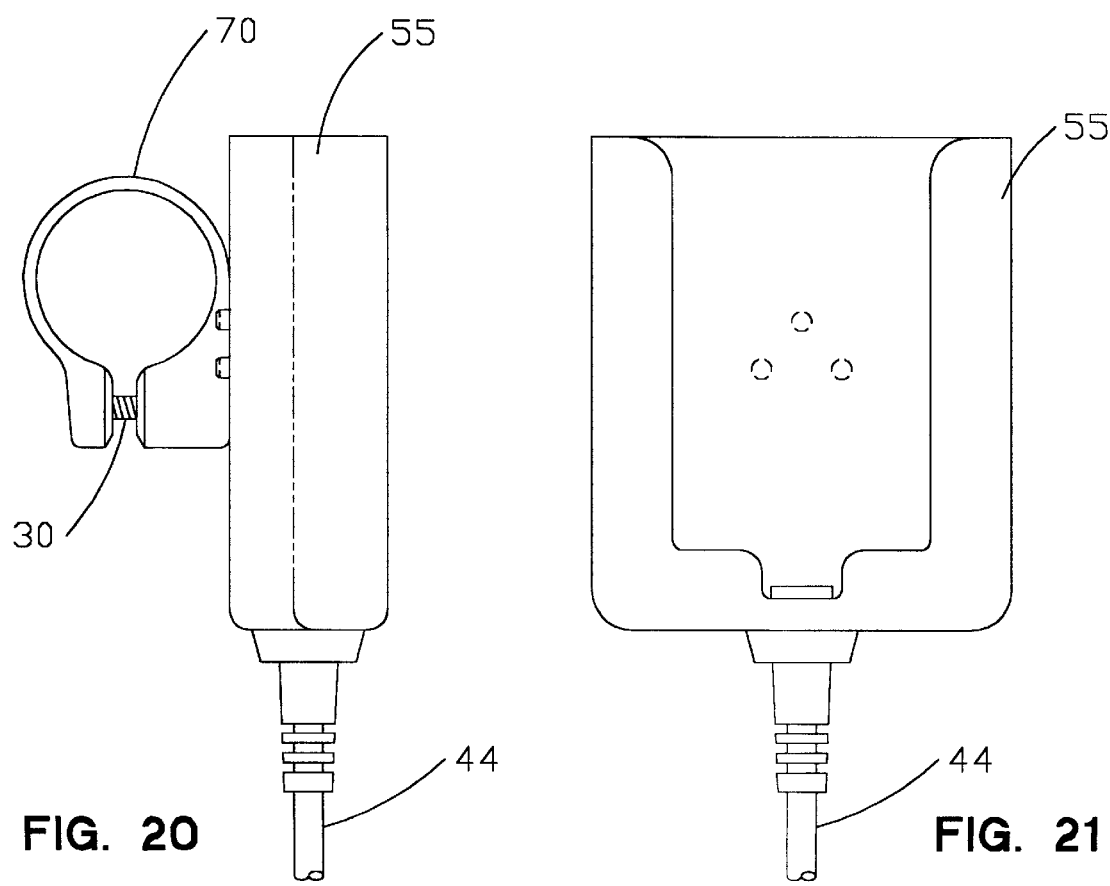
FIG. 19
FIG. 20      FIG. 21

AMUSEMENT AND ALERT ACCESSORY FOR BICYCLES

RELATIONSHIP TO OTHER APPLICATIONS

This application claims the benefits of U.S. PROVISIONAL APPLICATION No. 60/085,959 filed May 19, 1998, which is hereby incorporated by reference in its entirety.

FIELD OF THE INVENTION

The present invention relates to an accessory for bicycles. More particularly, the invention relates to a sound generating device and control display for amusement and/ or safety of bicyclists or others nearby. The invention is an alert and amusement accessory designed to be mounted on the frame member and engaged in the front or rear wheels of velocipedes. More specifically, the invention is a noisemaker which is coupled to a wheel of a velocipede and which is adapted to selectively produce audible sounds.

BACKGROUND

Bicycles are common and well known implements of travel and recreation in modern society. However, bicycles are merely one form of a "velocipede", which term is herein intended to mean a vehicle by which a person may travel, including but not limited to: bicycles, tricycles, skates, skateboards, rollerblades, wheelchairs, trucks, motorcycles or toy vehicles. Accordingly, all references which are specifically directed hereunder to bicycles are further intended to include by implication other velocipedes where applicable according to one of ordinary skill.

Bicycles are being increasingly used for recreation in parks or bike trails. In addition, children commuting to school and adults to work add to the rising number of bicyclists on streets in communities. Furthermore, bicycles have developed as occupational vehicles such as, for example, as used by messengers, professional racers, and police officers). According to the growing use of bicycles for travel, concomitant safety concerns have evolved at an equal rate, and particularly in regards to the increased bicycle traffic in the urban environment. For example, it has been disclosed that over 400,000 children age 14 and under are treated in emergency rooms each year for bicycle-related injuries. Moreover, it is further believed that greater than 75% of bicycle fatalities are due to head injuries that occur are a result of falling and striking paved surfaces, usually city streets.

In many circumstances, there is a need to for a cyclist to alert others within a zone of danger of the cyclist's proximity and direction of approach. Therefore, bicycles, in contrast to their essentially silent nature must become a noisemaking presence in the urban environment. For example, bicyclists frequenting urban trails are commonly required to have a audible alert accessory with an audible range of 100 feet. When commuting at dawn or dust, the streets are dark and bicyclists need to see, and be seen and heard.

In addition to the safety concerns just described, noisemakers on bicycles are also well known for other applications. For example, it has been observed that toys equipped with some type of noisemaker tend to aid parents in locating children who are apt to wander off. In another example, bicycle and other velocipede noisemakers also tend to have amusement value, particularly for children who combine noisemaking with riding toys, bicycles, or other velocipedes during play.

According to the safety concerns and other noisemaking needs related to velocipedes as just described, noise makers such as bells and horns have traditionally been made available as velocipede accessories. In general, such traditional bells and horns make noise on command by actuating a lever or button made available to the user while riding, such as in a common application on a bicycle's handlebars.

In addition to the traditional bicycle bells or horns, various forms of strikers have also been disclosed as a noisemaking implement for velocipedes with wheels having spokes. The term "striker" and variants thereof is herein intended to mean a mechanism coupled to a velocipede's wheel and which is struck by the wheel's spokes when turning to thereby emit a sound.

Perhaps the most traditional forms of bicycle "striker" noisemakers have generally been developed by children during play. One well known and traditional form of a bicycle striker involves mounting playing cards with clothes pins to the fork of a bicycle wheel such that, as the wheel's spokes strike the playing card a sound effect intended to mimic a motor is made. Other typical and traditional amusement accessories for bicycle wheels used decorative materials interlaced through the spokes, or reflective materials mounted on spokes. Other traditional variants of the playing card striker as noisemaker accessories include the use of flaps, reeds, or balloons mounted on the fork prong of a bicycle extended into the moving path of the spokes.

In additional to the traditional striker noisemakers just described, other striker noisemaker variants have also been disclosed in several various patent references.

For example, simple variations of the simple "playing card" version of a striker noisemaker have been described, and include specific mounting or material constructions in an assembly which simply engages a single card as a striker to wheel spokes. In one more specific example, U.S. Pat. No. 5,226,846 discloses use of a hinged clamp constructed of high friction, deformable materials and using springs to secure a mounting assembly to a bicycle so that a flap attached to the mounting assembly produce motor like sounds. In another more specific example, U.S. Pat. No. 5,611,558 discloses a striker assembly which uses a clothes pin-type assembly for mounting a two cards as strikers which are adapted to emit a sound when struck by wheel spokes.

In a further example of a simple striker noisemaker variant, U.S. Pat. No. 4,018,450 discloses a simple flap engaged to an attachment assembly having an elongated member shaped to receive and mount onto a bicycle fender brace. A slotted end lug is adapted to be clampingly held by the same clamping nut employed to secure the wheel fender brace to the associated wheel axle bolt. Therefore, installation of this noisemaker requires removal of the wheel axle bolt of the bicycle in order to secure the elongated member to the frame.

Another example of a known striker noisemaker variant for use with vehicles having spoked wheels is disclosed in U.S. Pat. No. 4,151,677 to Tucker. Tucker discloses a noisemaking accessory with a plurality of fingers extending radially from a plate which is mounted to a bicycle frame. The plate can be selectively rotated so that the fingers rotate through the path of travel of the spokes until a predetermined one of the fingers is positioned within that path. The desired noise is the noise which is emitted from the fingers as they are struck by the spokes.

Still another example of a known "spoked wheel" striker noisemaker is disclosed in U.S. Pat. No. 4,735,592 to Griffin. Griffin discloses a mounting assembly with a hollow member which is intended to simulate a motorcycle exhaust pipe including a hollow member, which can be outwardly flared from a front end to an open end. A spoke-engaging member vibrates when the spokes of a bicycle wheel rotate. The vibrations resonate through the hollow pipe creating a combustion engine sound.

In addition to the various forms of striker noisemakers which are specifically intended for use with spoked wheels, other modern noisemakers have also been disclosed which merely engage the wheel as an actuating mechanism to drive a separate noisemaker assembly which does not rely specifically upon emitting sounds by striking the wheel's spokes.

One specific example of a wheel actuated noisemaker is disclosed in U.S. Pat. No. 4,875,885 to Johnson. Johnson discloses a noisemaker for a bicycle that uses a drive wheel engaged to a wheel's tire and that is in turn engaged to a resonating assembly that includes a resonating chamber, a resonating plate, a compressible spring and associated cam mechanism. The assembly is adapted to produce sound intended to simulate an engine by directing a surface-engaging noise from the resonating plate and an air compression noise into the resonating chamber.

Another known bicycle noisemaker is driven by a battery and has a controllable pitch by use of a generator engaged to a bicycle wheel, as is disclosed in U.S. Pat. No. 5,314,372 to Kramer. More specifically, Kramer discloses a generator assembly which is driven by a roller engaged to a turning wheel. As the cyclists increases the pace of pedalling, the wheel and roller turn faster and the change in generator output modifies the pitch of the sound from the battery powered noisemaker in order to simulate the increased pitch of a motor as it is driven faster.

Some known problems or concerns which are believed to be variously attributable to at least one of the previously disclosed bicycle noisemakers such as those summarized above include, without limitation: difficult installation; slippage and rotation of the associated mounting assembly around the bicycle frame and can jam and bind wheel; inadequate volume of sound emitted, such as from strikers; strikers may be easily dislodged after limited use; traditional strikers tend to degrade after minimal use; sounds produced are not "realistic", such as for example do not sound similar to real motors; can not control the noisemaker between on and off during cycling; can not select between various sounds during cycling.

None of the cited velocipede noisemaker accessories includes a striker noisemaker assembly which provides multiple, independent strikers which may be independently selected for placement within the spoke path of a spoked wheel of a velocipede.

None of the cited velocipede noisemaker accessories includes a striker positioned within the spoke path of a spoked wheel, a microphone engaged to the striker and also to an amplifier, and a speaker coupled to the amplifier, such that vibrational sound from the striker when struck by the spokes may be amplified and broadcast from speaker during cycling.

None of the cited velocipede noisemaker accessories includes a striker noisemaker assembly adapted for use with a spoked wheel wherein any one of a plurality of separate and independent strikers may be selected for placement within a spoke's path of a wheel in order to produce a sound during cycling.

None of the cited velocipede noisemaker accessories includes a pre-recorded noise which is stored in a readable medium which is further coupled to a speaker and also to a wheel of a velocipede such that rotation of the wheel actuates or modifies a sound which is transmitted from the readable medium through the speaker.

GENERAL DESCRIPTION

The accessory of the present invention, is an amusement and engineering counter measure primarily designed to enhance fun for users, and aid in the reduction of crashes occurring in situations of vehicle/vehicle or vehicle/pedestrian interactions. The accessory can be configured to produce distinct sounds, such as motors, bells, trills, whistles, chimes, beeps, words, or phrases in order to alert others of a presence in the area. The accessory will allow activation by the motion of the rider or by the deliberate action of the rider.

The accessory described in the following descriptions, refer specifically to bicycles but the concepts are in no way limited. The concepts described may also be utilized on a variety of wheeled vehicles. Tricycles, skateboards, or toy vehicles such as trucks or cars with wheels that have wheel spokes or ribs that are capable of making contact with the actuating portion of accessory.

Even though, the invention was designed for fun and safety, the accessory has application to a variety of employment situations and the benefits are apparent over inventions solely developed for play.

The accessory can be configured as a children's' toy. The amusement aspect of invention enhances the play value and increases enjoyment derived from playing with toy vehicles, bicycles or using wheelchairs; especially for young people.

As a safety aide, the accessory acts as a visual and audio alert for children, senior bike riders, people who commute via wheelchair to shop, work, or make appointments.

The invention can be used as an occupational alert aide—bicycle messengers rely primarily on reflexes to avoid most crashes, but a motorist who turns right, without signaling; or the driver who runs a red light may be alerted to the presence of the cyclist if equipped with this invention.

The invention can be viewed as a platform on which to operate a series of accessories and devices, which can be incorporated or integrated into invention and used on wheeled vehicles

BRIEF DESCRIPTION OF DRAWINGS

FIG. 5a is a top view of cable assembly/resonating chamber for mechanical version FIG. 5b is a top view of cable assembly for mechanical version of accessory FIG. 6a is a side view of cable assembly with resonating chamber FIG. 6b is a side view of cable assembly FIG. 6c is a side view of resonating chamber assembly FIG. 19 is bottom view of cradle for removable control display unit FIG. 20 is side view of cradle for removable control display unit FIG. 21 is front view of cradle for removable control display unit

DESCRIPTION OF ACCESSORY

Figure 1:
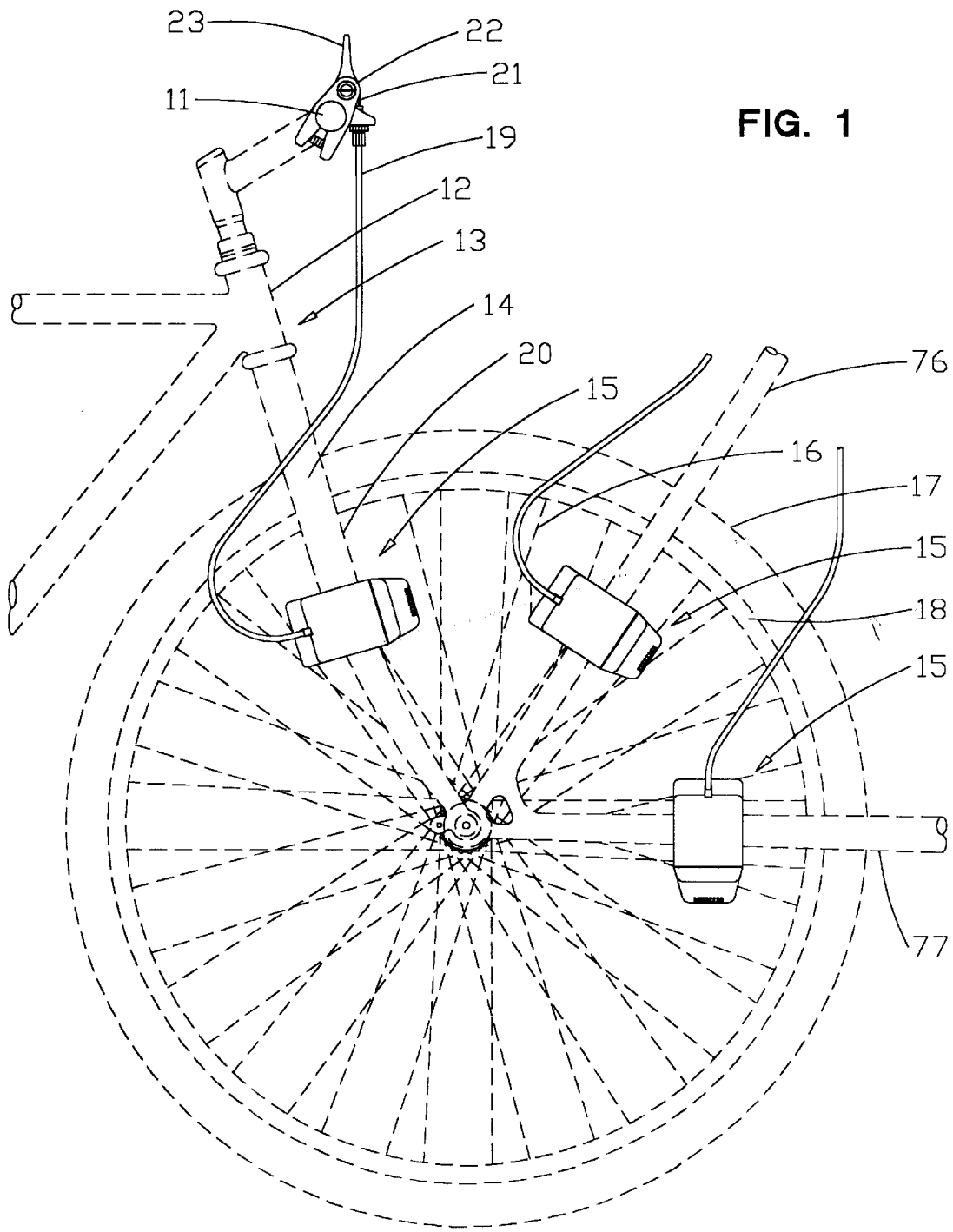
FIG. 1 is a side view of accessory attached to bicycle frame
Figure 2:
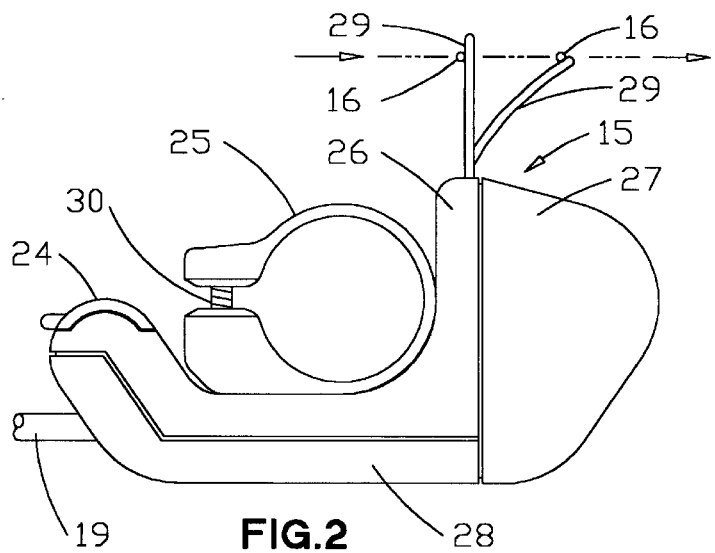
FIG. 2 is a top view of accessory
Figure 3A:
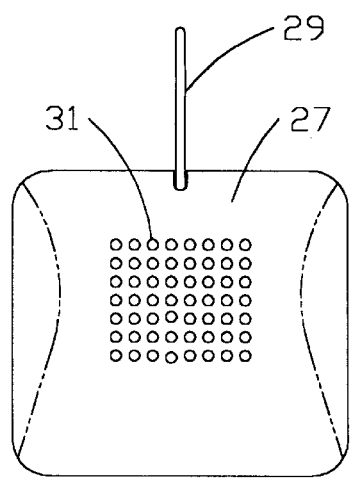
FIG. 3a is a front view of basic version of accessory
Figure 3B:
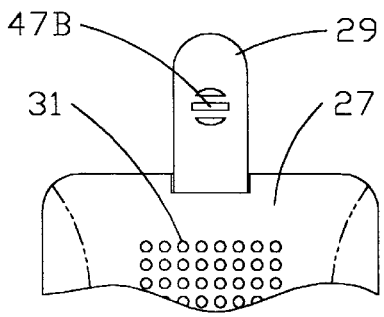
FIG. 3b is a front view of accessory with variation of striker
Figure 4:
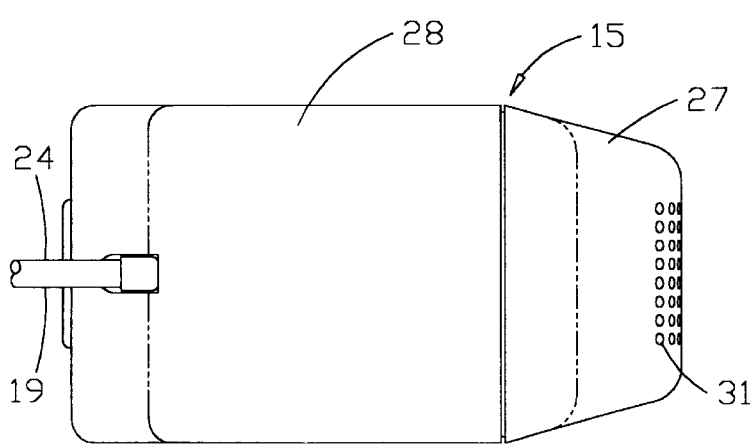
FIG. 4 is a side view of accessory

FIG. 1 is a side view of the amusement and alert accessory device 15 installed on a bicycle. FIG. 2 is a top view, FIGS. 3a and 3b are front views and FIG. 4 is a side view of amusement and alert accessory device. The device is formed of four assemblies, which include; an accessory device housing, one or more sound producing assemblies, a means to engage and control sound producing assembly, and a mounting assembly. In FIG. 1, the present invention is installed on the right prong 20 of front fork 14 of a bicycle 13 frame member 12. In addition, one or more of the accessory may be installed on various frame members, to include; attachment to either prong of front fork, rear chain stay 77, or rear fender brace 76. The accessory housing 15 consists of various casings designed to house sound producing elements. The housing, in addition, is designed to accommodate a mounting assembly. The cable control mechanism 19 in this embodiment of the invention utilizes a cable wire 21 for accessory control. The control shown in this figure is a lever which is secured to a bicycle handle bar 11 by a clamp 22. The control provides a means to activate and control sound producing assemblies and electronic components of the accessory. Accessory casings and structures may be fabricated or molded using metal, plastic, or other suitable materials; including relatively rigid plastic. External surfaces of accessory device may be formed from a light reflective material to increase visibility and provide a safety feature. Materials may be fluorescent or painted, and may display other characteristics to enhance visibility. The case may be decorated with corporate logos or likeness of popular images. The front case 27, shown in FIG. 2, may house a variety of electromechanical sound producing assemblies and serves as a protective cover for accessory components; as well as enhancing sound characteristics. The striker rod 29 of the assembly extends into the path of the spokes 16 of a wheel 17 of a bicycle 13, and triggers a response to each cycle of displacement, thereby producing a sound or activating a sound producing assembly. FIGS. 3 and 3a show ports or louvers 31 in front case that will permit sounds to be transmitted from the accessory. Electronic components may be housed in accessory case, or components such as a microphone 47b, may be integrated in a striker assembly as shown. The rear case 26 provides a means to mount and secure sound producing components in the case. The internal configuration may include alignment posts, grooves, stops, guides, standoffs, and cutouts that are positioned to accommodate sound producing assemblies and a cable control assembly 19. Electronic circuits and components and data cable for electronic version of accessory may be routed or mounted in or through case. Case may also contain a battery door 24 for replacing component. A mounting system consisting of a clamp 25 and screw 30 may be attached to case using screws, adhesives, and may be bonded or ultrasonically welded to form a single unit. In another embodiment of the accessory, the case may be configured with external structures that mate with internal structures of a housing built into a frame member. The side case 28 of accessory housing serves as a cover for the unit and provides routing channels for one or more control cable assemblies.

In the preferred embodiment, the mounting assembly shown in FIG. 2, consists of one or more clamps 25, screw, and insert. The mounting is designed to prevent rotation of the accessory 15 when secured to a frame member. The mounting system includes a clamp 25 with opening for receiving a portion of the bicycle frame, a fastener such as a screw 30, and threaded insert for closing the opening around the frame member; in this case, the prong 20 of a bicycle fork 14 (FIG. 1). The system is designed to be installed without the use of a tool or utilizing a simple tool such as a screwdriver or allen wrench. It is a further object of the invention to provide a clamping system, which can be used to secure the accessory at numerous locations on the frame members of velocipedes and vehicles. In the case of a bicycle, the mounting means will secure the accessory to either prong of front fork, rear seat stay, rear chain stay, front fender brace or rear fender brace. A bracket assembly as incorporated in the pending application Ser. No. 09/087,646, may be integrated within frame of bicycle during manufacture to provide amounting structure. The mounting assembly and rear case may be assembled as a single unit that may be machined or be bonded together. The accessory housing 15 and clamp 25 may be constructed of plastic or other durable materials. High impact resistant, durable materials are preferred. The surfaces of the accessory may be reflective, fluorescent, painted or display other characteristics to enhance visibility or aesthetics. The bonding may be by ultrasonic, liquid, or other means. Mechanical or chemical bonding, gluing or other adhesive means or mechanical connections may also be used to join assemblies.

FIG. 5a is a top view of cable assembly with resonating chamber. FIG. 5b is a top view of cable assembly with striker. FIG. 6a is a side view of cable assembly with resonating chamber. FIG. 6b is a side view of a cable assembly, and FIG. 6c is a side view of resonating chamber assembly. Mounted within the accessory housing may be housed numerous sound producing assemblies. In the embodiment shown, the sound producing assembly consists of a striker rod 29, flex pad mount 32, cable coupler 36, striker guide 37, resonating chamber 33, striker 34, and control cable assembly 19. When the striker rod 29 is extended in the path of the spokes 16, the displacement activates a striker 34 in resonating chamber 33. Sound is produced from striker 34 contact with chamber 33 as the wheel rotates. The sound is repeated at a frequency proportional to the speed of rotation of a wheel or can be adjusted by electronic or mechanical means. Sounds produced will vary according to characteristics of striker rod, striker, and resonating. Characteristics include construction materials, size, thickness, length, configuration, location and orientation of components.

A striker 29 may be formed of metal, plastic, paper, rigid foam or coated materials; may be flat, forming a flap: round as forming a rod; square, triangular or rectangular in shape. Strikers may be solid, hollow, corrugated, and may have textured surfaces. Strikers may be constructed or coated with light reflective materials, such as plastics or paper to provide a visual alert characteristic. The term striker also covers configurations that may be known as flaps, rods, triggers, pads, or the like. The striker can be straight or assume a variety of angles to aid in installation on a variety of structures or locations. The shapes and sizes of the strikers will influence the sounds produced. The proximal end is connected to a control cable assembly 19 while the distal end extends into the path of the spokes 16 of a bicycle where, upon impact with spokes, displaces a sound producing assembly or triggers a switch to produce desired sounds. When accessory is installed on the fork of a bicycle, the striker rod may be positioned about midway between the center and rim 18 of the wheel 17, as shown in FIG. 1. The accessory is engineered so the rod extends just short of the centerline of the tire, which insures that striker rods will not interfere with each other if installed in pairs on the same or on opposite prongs of a bicycle fork. Multiple strikers may be installed in an accessory housing. Each striker rod may be attached to a separate mechanical assembly or activate a switch or independent switches.

A resonating chamber striker 34 may be suspended within or can be mounted in proximity of a resonating chamber assembly 33. As the spokes 16 of a wheel 17 engage a striker rod 29, displacement will occur sufficient to allow the resonating chamber striker 34 and resonating chamber 33 to act as hammer and anvil to produce and amplify sound. Striker objects may be metal, plastic, wood, hollow tubes, steel balls or the like, or marbles. Striker may be fixed or free moving: as being attached to a spring. The resonating chamber 33 of FIG. 5a, is constructed of metal, plastic, rigid foam or coated materials. The resonating chamber may be open, closed, or partially closed sufficiently enough to contain free moving strikers. When the striker rod is engaged and the wheel rotates the striker or balls are free to roll or bounce around within the housing. The internal surfaces of resonating chamber may be formed with inwardly -projecting ridges which increase the bouncing of the striker, ball or hammer thereby enhancing the clatter produced as the ball or hammer moves around the chamber. In this variation, the resonating chamber assembly consists of the chamber 33, striker 34, and hanger 35, upon which the resonating chamber is attached or suspended.

Figure 7:
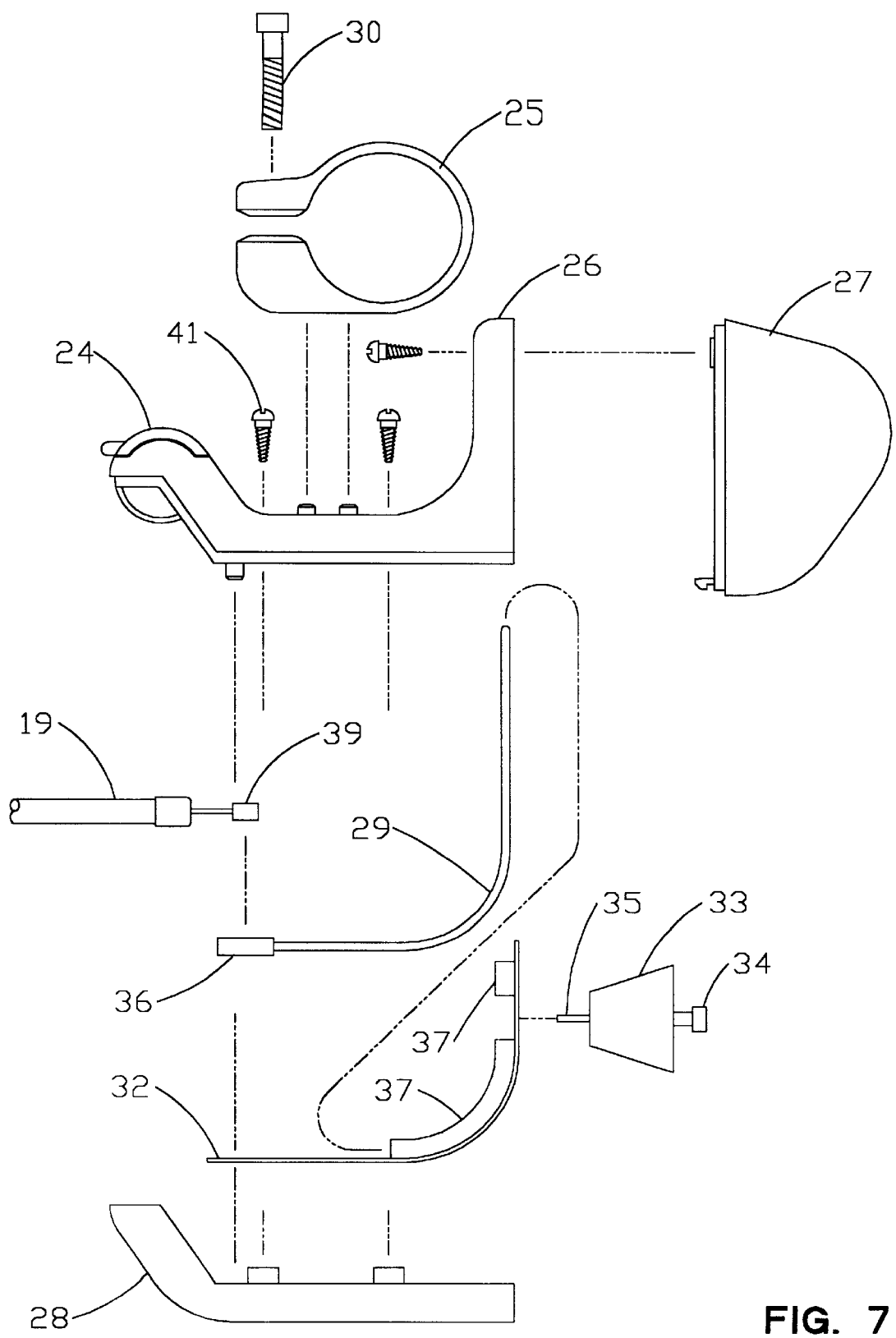
FIG. 7 is exploded view of mechanical version of accessory

A flex pad mount 32 is a flexible, durable, lightweight form of varying lengths and widths, composed of plastic, metal, or other suitable material. It serves to capture striker rod 29, resonating chamber 33 and is secured to rear case by posts located at proximal end or by use of screws using mounting holes 38 located in flex pad mount. The flex pad mount is displaced when striker rod impacts spokes allowing striker to impact the resonating chamber. The flex pad mount has a cable coupler 36 that serves to stabilize cable anchor 39 and striker rod 29 attachment point, as well as striker guides 37 designed to act as routing channels for striker rod. FIG. 7 is an exploded view of the assembly for a mechanical version of the accessory with a resonating chamber assembly.

Figure 8:
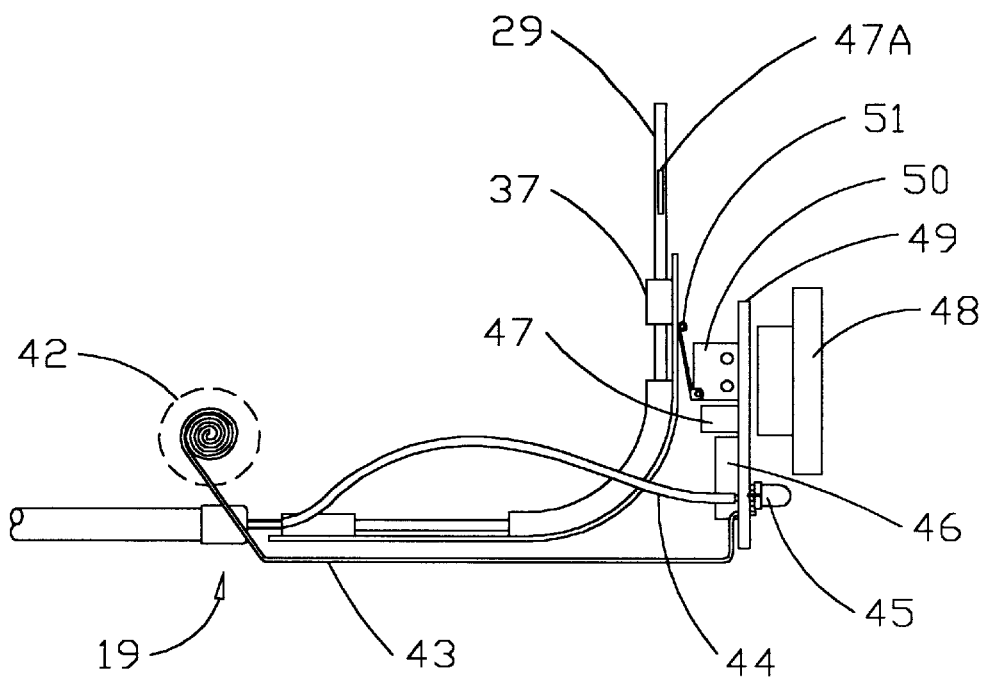
FIG. 8 is a top view of sound producing assembly for electronic version of accessory
Figure 9:
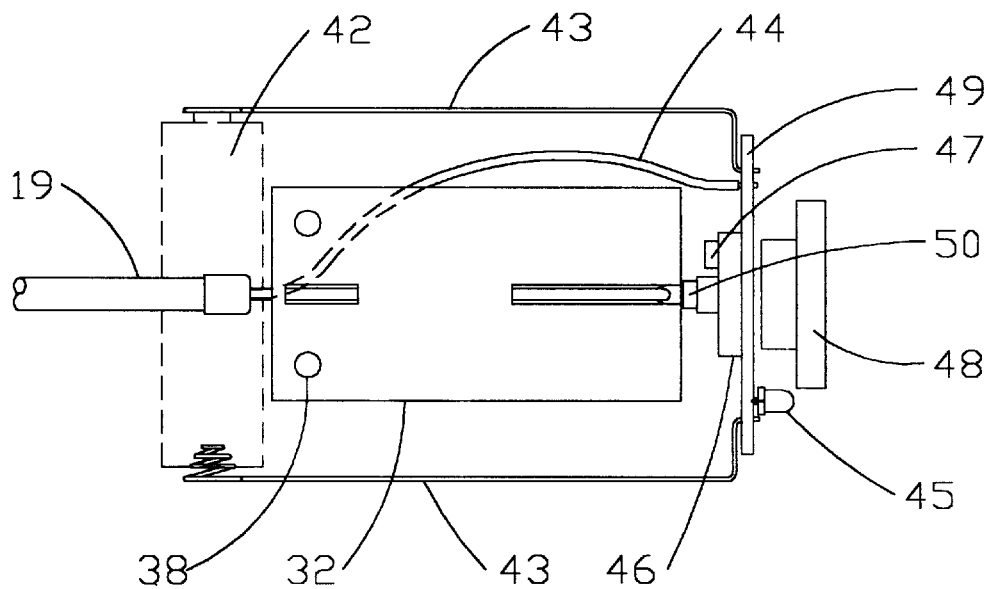
FIG. 9 is a side view of components for electronic version of accessory
Figure 10:
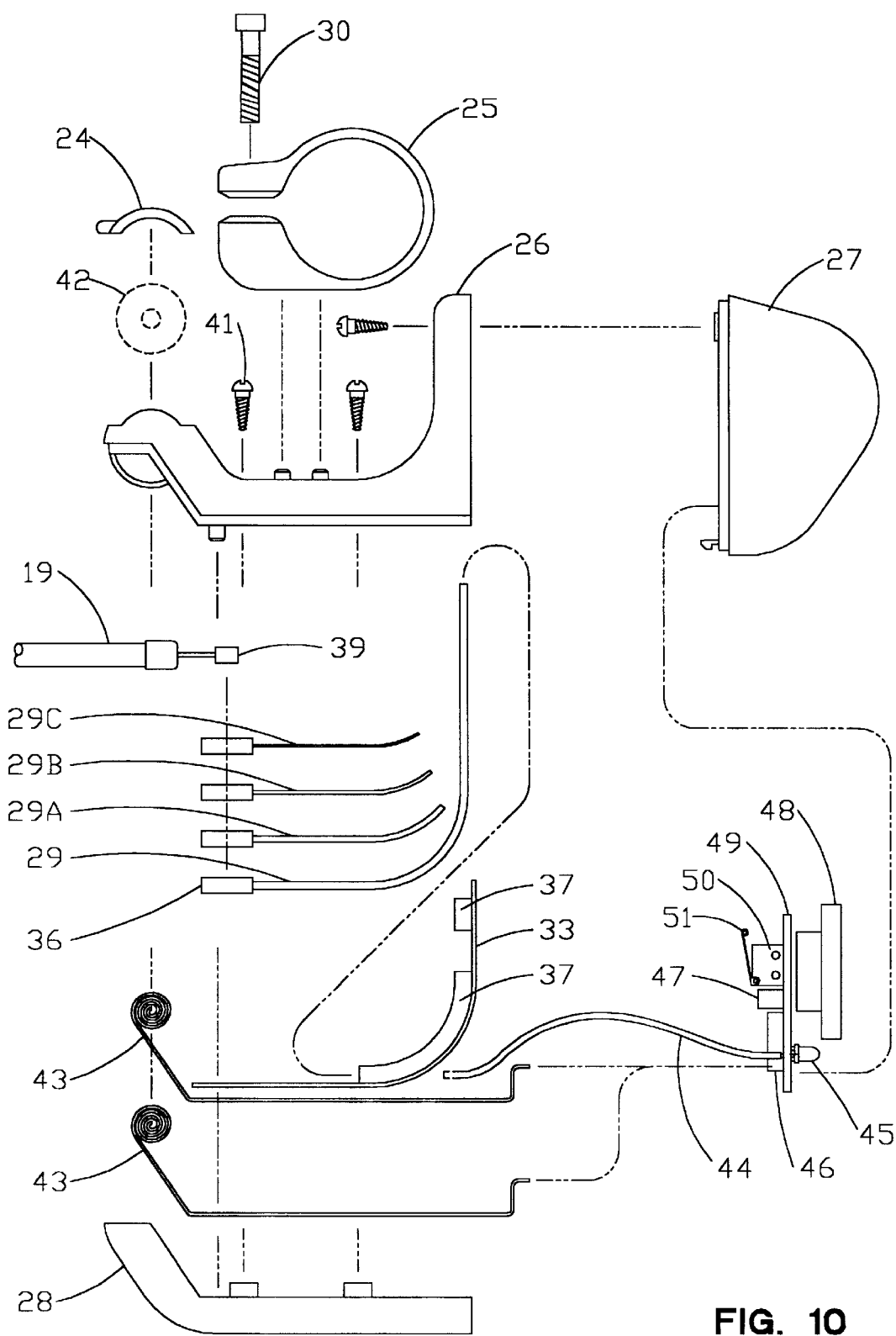
FIG. 10 is an exploded view of electronic version of accessory

Another embodiment of sound producing assembly incorporates components as shown in FIGS. 8, 9, and 10. The assembly is configured as an electronic means to produce sounds in accessory device. The external housing and mounting system for this version of the sound producing assembly is as previously described for the accessory using resonating chamber assembly for sound production. The internal configuration of the accessory housing will accommodate components and circuitry for sound production, amplification/enhancement, and transmission of sound. A battery door 24, routings for battery contacts 43, and one or more data cables 44, may be integrated into rear case. The sound producing assembly consists of a striker rod 29, flex pad mount 32 with mounting holes 38, striker guides 37 and cable coupler 36; cable anchor, and control cable assembly 19. The PCB 49 may contain components and circuits to control numerous devices mounted within control display unit and accessory housing. Components and may include a battery 42, connections for data cable 44, memory chip 46, low battery indicator light 45, speaker 48, microphone 47, switch 50, switch trigger and generator 51, and battery contacts 43. The striker rod of the assembly extends into the path of the spokes of a wheel of a bicycle. Striker rod, flexes pad mount and cable control assembly may be of the same construction materials as used in mechanical version of accessory that uses resonating chamber assembly. FIG. 8 shows a microphone 47a located on distal end of striker rod to pickup and transmit sound of spokes striking the striker rod. Amplification components may be on flex pad mount or placed in product housing. Microphone may be also located in housing of accessory as shown in FIG. 9. The sound producing assembly produces sound in response to each displacement of a striker rod when it extended into path of the spokes of a bicycle. The displacement of the flex pad mount assembly activates a trigger on switch, which allows for programmed sound production or retrieval. The sound to be repeated at a frequency proportional to the speed of rotation of a wheel. Sounds produced will vary according to characteristics of sounds stored on chip or characteristics of strikers 29, 29a, 29b, 29c as illustrated in FIG. 10. The unit is connected via electrical cable to PCB, switch and/or other components located within accessory case or control unit. Sounds may be acquired from digitally stored sound in microprocessor bank, which can be located in accessory housing, on flex pad mount, on PCB, or in removable control unit. Sounds can be recorded, digitized and stored on microprocessor which may be made available to user as required, with or without bicycle being put in motion. These may include phrases or words of warning such as "HEY!" "COMMING THROUGH!" "LOOK OUT!" Other sounds may include beeps, tugboat horns, train whistles, truck horns, trills, and the like. Sounds and phrases can be looped to provide continuous or repeated warning. Microprocessor may also be utilized to control radio, lights, odometer, or other accessories located within or attached to housing, bracket, case, or clamp of accessory. FIG. 10 is an exploded view of electronic accessory.

Figure 11:
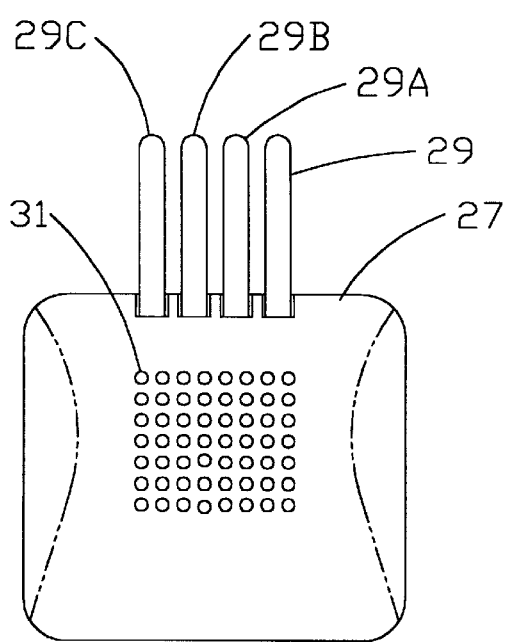
FIG. 11 is a front view of multiple striker electronic version of accessory device
Figure 12:
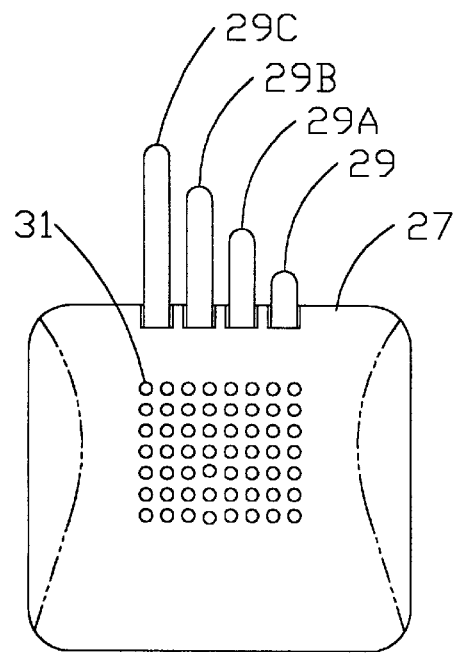
FIG. 12 shows a front view of multiple strikers, extended to various degrees
Figure 13:
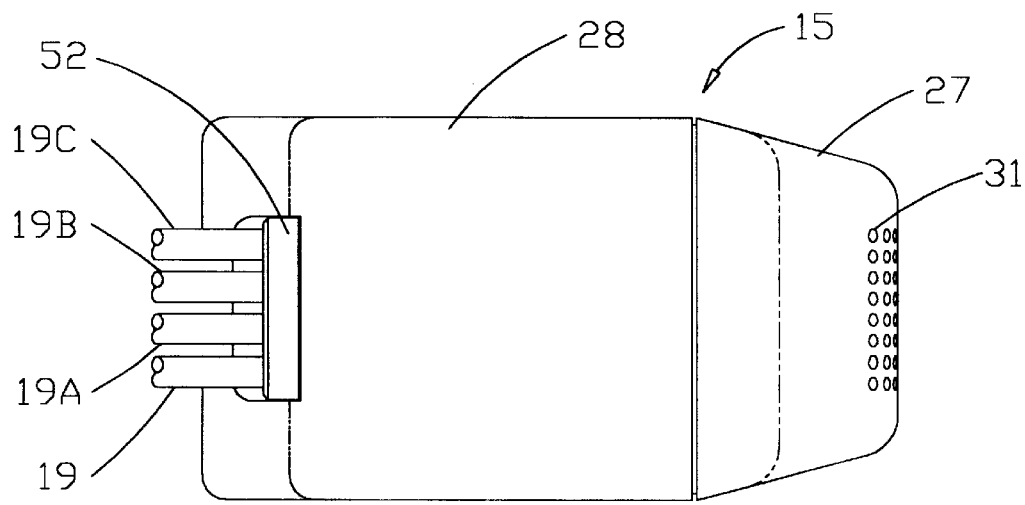
FIG. 13 is a side view of control cables for multiple striker version of accessory

In another embodiment of the assembly, speaker may be located on flex pad mount or in housing of accessory. In yet another variation, the accessory can be activated by use of motion detectors, which do not require spokes to interface with striker rod for operation. In yet another variation of the assembly, as shown in FIGS. 11 and 12, multiple, independent, striker rods 29, 29a, 29b, 29c are mounted in the accessory housing and independently advanced or retracted in path of spokes to produce distinct sounds. FIG. 13 shows cable controls 19, 19a, 19b, and 19c, that are routed or trapped by cable allinger 52 which allows striker rods to be incrementally and independently deployed to alter sounds produced by assembly. Striker rods may be constructed of dissimilar materials, varied thickness, and lengths; control cable may be covered by extrusion that acts as conduit for control and/or electrical cables. Striker rods may activate one or more switches located in accessory housing or on PCB.

Figure 14A:
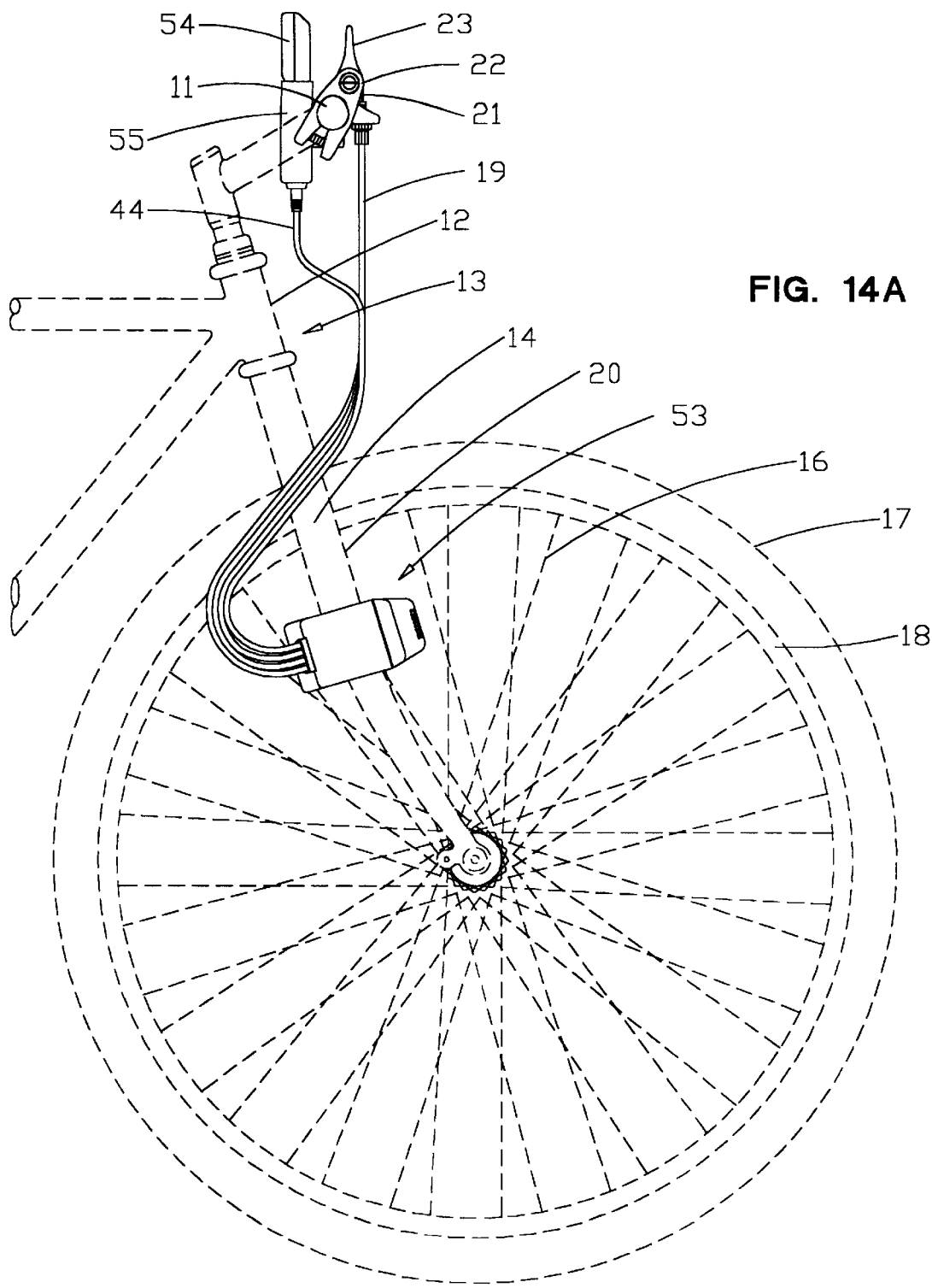
FIG. 14a is a side view of accessory device, control levers, cradle removable control display unit with heart rate monitor
Figure 14B:
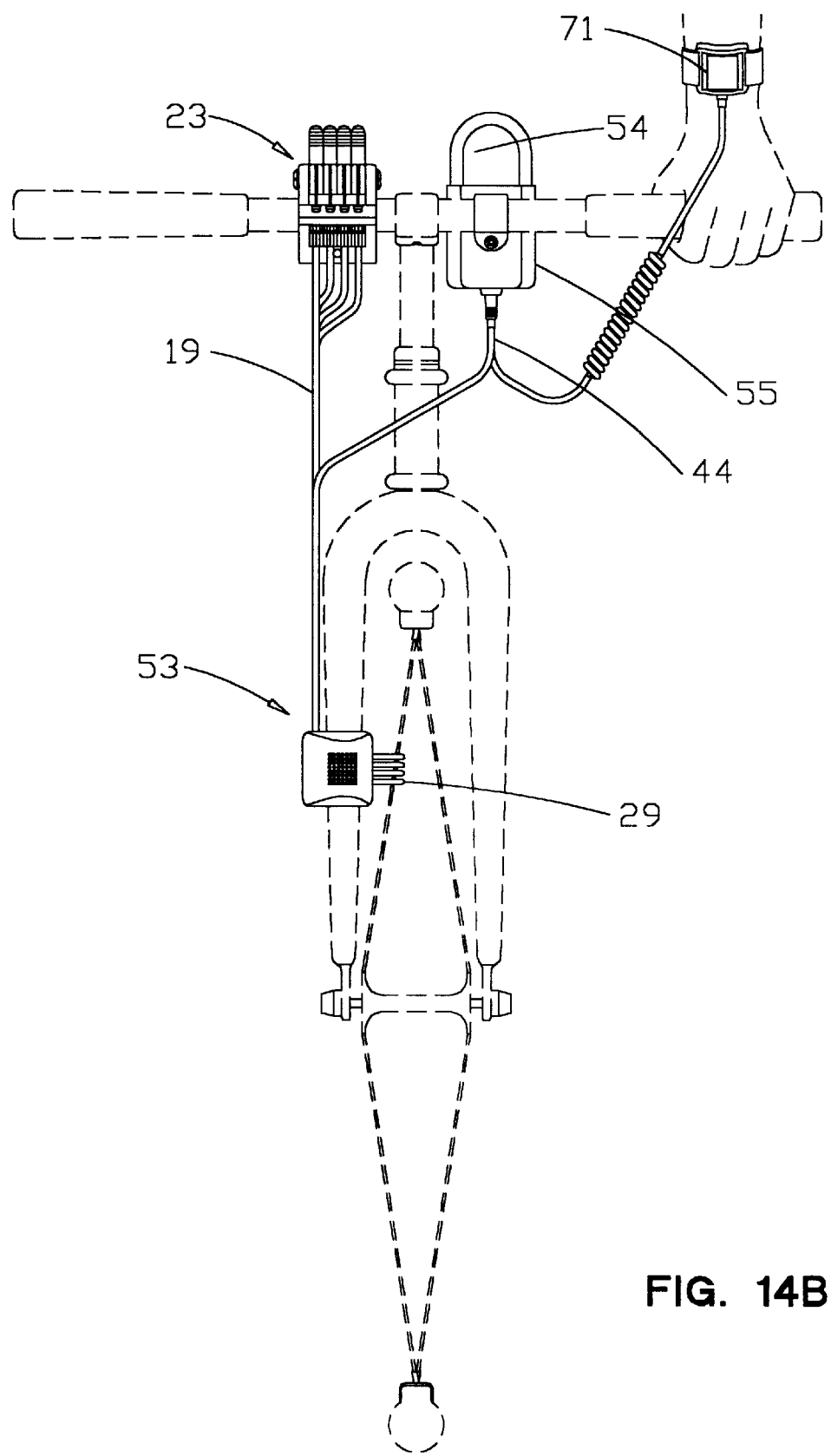
FIG. 14b is a front view of accessory device, control levers, cradle and removable control display unit

FIGS. 14a and 14b are side and front views of multiple striker version of accessory device 53, multiple striker 29, multiple cable controls 23, cradle 55, data cable 44, and removable control display unit 54. Cable control assemblies provide means to (extend/ withdraw) striker rod into/from wheel spoke path. A wristband 71 containing sensors for physiologic measurements may be connected to accessory to monitor a rider's health status.

In this variation of device, multiple cable controls 19, 19a, 19b, 19c, are mounted on handlebars 11 of a bicycle and configured to independently control striker rods 29, 29a, 29b, 29c, which are installed in accessory housing. Each striker rod may be attached to a separate mechanical assembly or activate a trigger 51 of a switch or independent switches to activate sound producing assembly. The distal end of the control cable assembly is attached to an anchor 39 using coupler 36 of flex mount pad 32 to attach striker rod. Proximal control can be located on handle bars, or other suitable frame location and may include lever or switch for engagement/disengagement of striker rod while vehicle is in motion or stopped. In yet another variation, a control lever or switch may be located on body of accessory housing (FIG. 1) and is connected to cable assembly. Travel of lever allows distal portion of striker rod to be extended or retracted from path of spokes or ribs of wheels. In another version of accessory, a striker rod may be permanently extended into path of spokes, with no means provided to extend or withdraw striker rod. In yet another embodiment, the accessory can be operated and function with only striker rod configured in accessory housing. This configuration will produce sounds without use of a resonating chamber or electronic versions of sound producing assemblies.

Figures 15, 16:
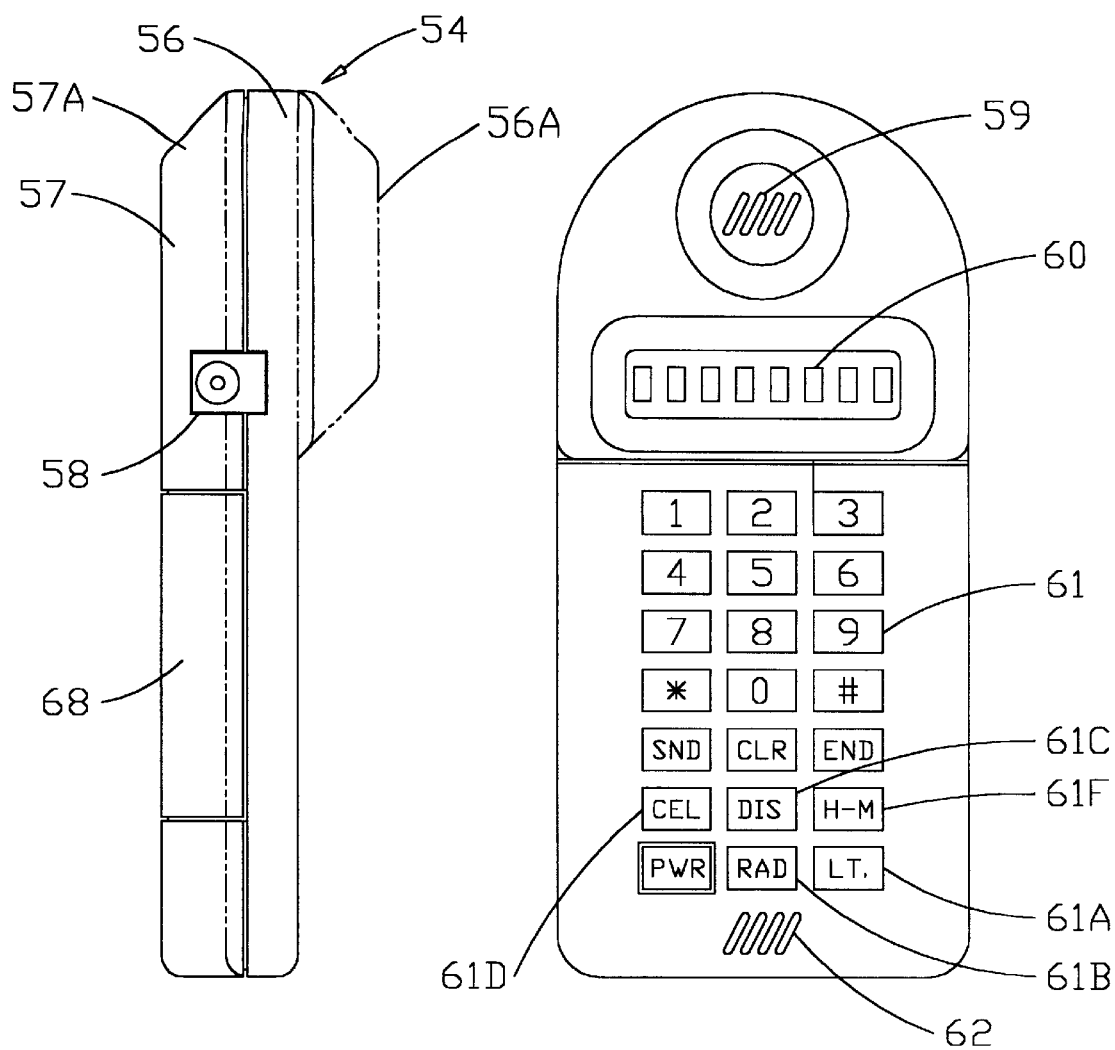
FIG. 15 is side view of removable control display unit with light
FIG. 16 is front view of removable control display unit
Figure 17:
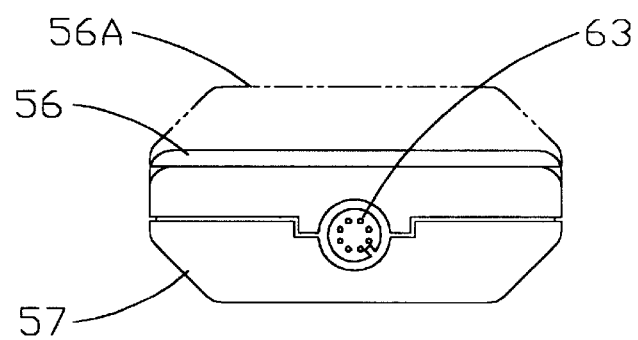
FIG. 17 is bottom view of removable control display unit

FIGS. 15, 16, and 17, represent side, front, and bottom views of removable control display unit. The removable control display unit may be constructed of plastic or other suitable materials. It consists of a front case 56, rear case 57, charger and adapter jack for AC/DC power supply, and may contain a battery pack and door for access. A light assembly 57a may be incorporated into case 57 and outfitted with a lens 56a to focus light beam. The charger/adapter jack of the control/display unit is designed to mate with a battery recharging unit. A rear case may include a battery door or the rear case may be constructed to incorporate the battery as is common in many mobile phones. The battery pack may be of the alkaline or rechargeable variety. A solar cell may be incorporated to power some accessory functions.

Figure 18:
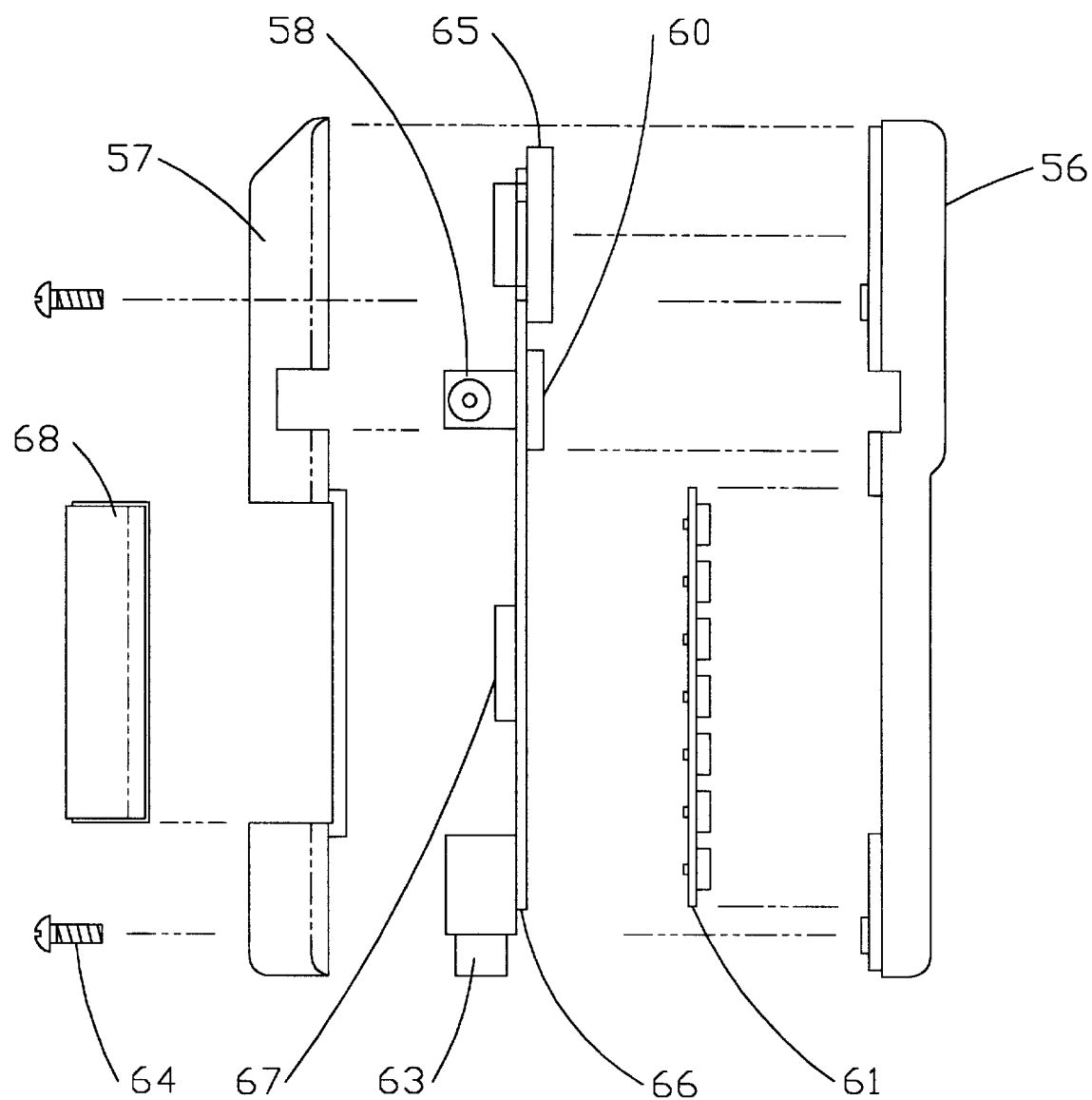
FIG. 18 is exploded view of removable control display unit

The front case may house speaker or receiver components 59, single or multi-line alphanumeric display 60, keypad 61 for data entry or control of lights 61a, radio 61b, odometer 61c, cell phone 61d, heart monitor 61f, or contain a microphone 62. An electrical connector 63 located on the control display unit, mates with the electrical connector located in the accessory cradle to provide means to transfer data to and from accessory device. FIG. 18 shows an exploded view of the removable control display unit consisting of front 56 and rear cases 57, and indicating locations of LCD display 60, adapter 58, memory chips 67, battery pack 68, speaker 65, keypad 61, data connector 63, and screws 64 for assembly.

FIGS. 19, 20, and 21 are bottom, side, and front views of cradle for removable control display unit of accessory. The cradle 55 can be molded of plastic or other suitable materials. The cradle provides routing channels for inserting removable control display unit within cradle. The control display unit is received within channels of the cradle thereby aligning the control display unit and data cable connectors within cradle. Channels and grooves may increase strength of coupling between assemblies and may prevent control display unit from being inserted backwards or upside down. A clamp 70 to mount cradle to frame member. The clamp is secured to frame member by a screw and threaded insert of the mounting assembly. Means are provided, via data cable 44, for connection to printed circuit boards, switches, or electronic components located within the accessory housing. The data connector 69 of the cradle, mates with data connector 63 of the removable control display unit, when inserted and secured within cradle. The cable from the cradle can be encased with insulating materials or be coupled with striker rod control cable(s), located within multi-lumen extruded tubing. The cradle is attached to handle bars, or other suitable location, with the dimensionally modified clamping system used to attach accessory housing to frame. Ability to adjust viewing angle.

FIG. 14b illustrates the preferred embodiment of the removable control display unit as it is mated with control cradle as previously described. The unit consists of a touch sensor keypad 61, which can be configured to activate and control a variety devices. Controls can be configured to control volume, tuning for radios and scanners, access to pager information, internet access for e-mail or surfing. The front case may accommodate switches or input controls for activating or altering functions, activating monitoring devices or activating warning indicators. A display area may indicate accessory status, mode of operation, monitor adjustments and may include readouts for speedometer, odometer, clock, pager or other devices.

Figure 22:
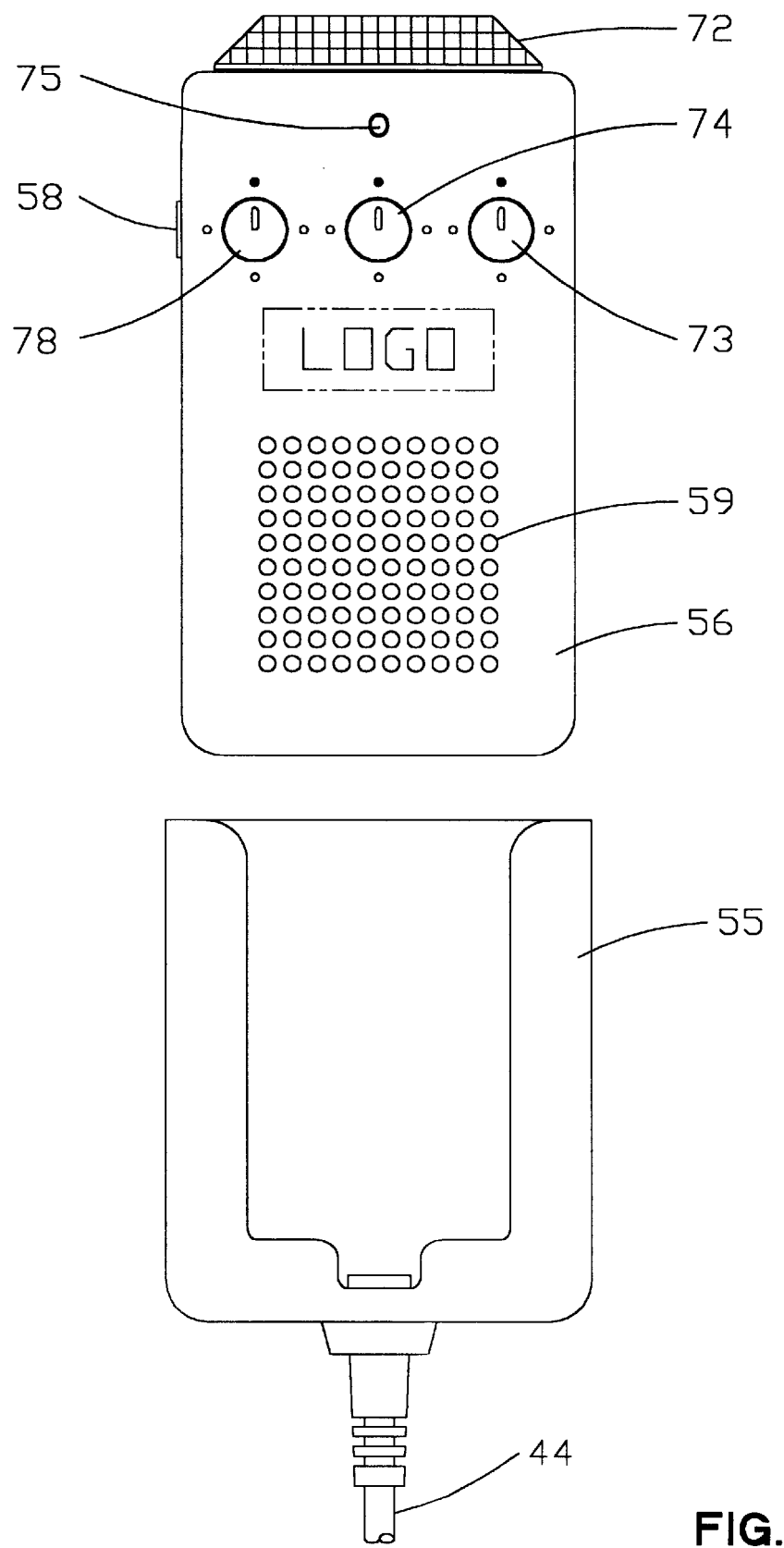
FIG. 22 is a front view of alternate version of removable display control unit

FIG. 22 shows yet another embodiment, wherein, the removable control unit has control knobs or switches with means to select sounds produced by assemblies, means to vary volume of sounds 73, and means to independently select sounds 74; such as distress or alarms from micro processor. Removable control unit may accommodate a solar cell 72 for generating power for accessory, a jack for battery charging, a warning light to indicate alert mode 75, or speaker.

Although the examples given include many specifications, they are intended as illustrative of only a few of the possible embodiments of the invention.

We claim:

1. An amusement and safety alert accessory for use in a vehicle, said vehicle having a frame member for transferring support and transporting motion for a supporting motion assembly in which the supporting motion assembly includes at least one wheel, said wheel is rotatable with respect to said frame member, said vehicle is capable of movement by means including said wheel, said amusement and safety alert accessory comprising:

accessory housing means for housing said amusement and safety alert accessory;

a speaker;

an assembly that activates the speaker;

sound for producing assembly means for producing sound, said sound producing assembly means has a striker that is a flexible element, said striker can be engaged with said wheel when said wheel is in rotation, causing said striker to flex in a flapping motion, thereby producing a first sound, and wherein movement of said striker moves the assembly that activates the speaker to produce a second sound;

engaging and control assembly for engaging and controlling the sound producing assembly means to engage with said wheel, said striker is positioned by said engaging and control assembly within a spoke path defined by said wheel when in rotation;

accessory mounting assembly means for mounting said amusement and safety alert accessory on said frame member;

a microphone coupled with said striker;

an amplifier cooperating with said striker and said microphone;

wherein said speaker is coupled-to said amplifier;

wherein said first sound is a vibrational sound produced by the flapping motion of said striker when engaged with moving spokes within said spoke path, said second sound is a sound broadcast by said speaker, and wherein said microphone, amplifier and speaker cooperate to amplify and broadcast said first sound as said second sound from said speaker when said wheel is in rotation.

2. The amusement and safety alert accessory of claim 1, wherein said sound producing assembly means may be activated by a device selected from the group consisting of a motion detector and a manual switch.

3. The amusement and safety alert accessory of claim 1 wherein said engaging and control assembly means includes a removable assembly.

4. The amusement and safety alert accessory of claim 3 wherein said removable assembly includes one member selected from a group consisting of a radio, a pager, a cellular phone, a heart monitor, a display device, and a radio channel scanner.

5. The amusement and safety alert accessory of claim 1 wherein said accessory mounting assembly means accommodates one additional accessory selected from a group consisting of a speedometer, an odometer, a clock, a telephone, a pager, a radio, a bicycle computer, and a device capable of monitoring items of interest to a vehicle rider including current time, elapsed time, current speed, and odometer readings.

6. The amusement and safety alert accessory of claim 1 wherein said sound producing assembly comprises means to adjust volume of sound selected from the group consisting of mechanical means and electronic means.

7. The amusement and safety alert accessory of claim 1 wherein said sound producing assembly cooperates with said engaging and control assembly means to alter at least one attribute of said sound produced, said attribute selected from the group consisting of pitch, frequency, and duration.

8. The amusement and safety alert accessory of claim 1, wherein said assembly that activates includes a switch for activating said speaker that produces a second sound.

9. The amusement and safety alert accessory of claim 1, wherein said flexible element is partly inside of said accessory housing means and partly outside of said accessory housing means.

10. The amusement and safety alert accessory of claim 9, wherein a guide inside of said accessory housing means channels movement of said flexible element.

11. The amusement and safe alert accessory of claim 10, wherein said guide and said assembly that activates are coupled with a pad and said pad is mounted to said accessory housing means.

12. The amusement and alert accessory of claim 11, wherein said flexible element is a rod.

13. An amusement and safety alert accessory for use in a vehicle, said vehicle having a frame member for transferring support and transporting motion for a supporting motion assembly in which the supporting motion assembly includes at least one wheel, said wheel is rotatable with respect to said frame member, said vehicle is capable of movement by means including said wheel in rotation with respect to said frame member, said amusement and safety alert accessory comprising:

accessory housing means for housing said amusement and safety alert accessory;

sound producing assembly means for producing sound when said sound producing assembly means is engaged with said wheel and said wheel is in rotation;

engaging and control assembly means for engaging and controlling the sound producing assembly means to engage with said wheel;

accessory mounting assembly means for mounting said amusement and safety alert accessory on said frame member;

wherein said sound producing assembly means has a striker noise making assembly adapted for use with spokes of said wheel, part of said striker noise making assembly moving when said wheel is in rotation within a spoke path, said spoke path is defined by said wheel, wherein any combination or all of a plurality of separate and independently moveable strikers may be selected for placement within said spoke path to produce a sound when said wheel is in rotation.

14. An amusement and safety alert accessory for use in a vehicle, said vehicle having a frame member for transferring support and transporting motion for a supporting motion assembly in which the supporting motion assembly includes at least one wheel, said wheel is rotatable with respect to said frame member, said vehicle is capable of movement by means including said wheel, said amusement and safety alert accessory comprising:

accessory housing means for housing said amusement and safety alert accessory;

sound producing assembly means for producing sound, said sound producing assembly means has a flexible element, said flexible element can be engaged with said wheel when said wheel is in rotation, causing said flexible element to flex in a flapping motion, thereby producing a first sound, and wherein movement of said flexible element moves an assembly that activates a device that produces a second sound;

engaging and control assembly means for engaging and controlling the sound producing assembly means to engage with said wheel;

accessory mounting assembly means for mounting said amusement and safety alert accessory on said frame member;

wherein said sound producing assembly means produces sound when said sound producing assembly means is engaged with said wheel and when said wheel is in rotation, said sound producing assembly means also includes a speaker a pre-recorded noise stored in a readable medium;

means for coupling said pre-recorded noise to said speaker and said wheel such that said wheel causes an action selected from the group of actuating the second sound by transmitting the second sound from the readable medium through the speaker and modifying a sound transmitted from the readable medium through the speaker to form said second sound.

15. The amusement and safety alert accessory of claim 14 wherein said second sound is at least one distinct sound, said at least one distinct sound is selected from the group consisting of motors, bells, trills, whistles, chimes, beeps, words and phrases.

16. The amusement and safety alert accessory of claim 14, wherein said action also activates a visual alert.

17. An amusement device having an amusement and safety alert accessory attached with a vehicle, wherein said vehicle is selected from the group consisting of tricycles, skateboards, toy trucks, toy cars, said vehicle having at least one wheel with spokes capable of making contact with an actuating portion of said amusement and safety alert accessory;

said vehicle having a frame member for transferring support and transporting motion for a supporting motion assembly in which the supporting motion assembly includes the wheel, said wheel is rotatable with respect to said frame member, said vehicle is capable of movement by means including said wheel, said amusement and safety alert accessory comprising:

accessory housing means for housing said amusement and safety alert accessory;

sound producing assembly means for producing sound when said sound producing assembly means is engaged with said wheel and said wheel is in rotation;

engaging and control assembly means for engaging and controlling the sound producing assembly means to engage with said wheel;

accessory mounting assembly means for mounting said amusement and safety alert accessory on said frame member;

wherein said sound producing assembly means has a striker noise making assembly adapted for use with spokes of said wheel, part of said striker noise making assembly moving when said wheel is in rotation and when placed within a spoke path, said spoke path is defined by said wheel, wherein any combination or all of a plurality of separate and independently moveable strikers may be selected for placement within said spoke path to produce a sound when said wheel is in rotation.

18. An amusement device having an amusement and safety alert accessory attached with a vehicle, wherein said vehicle is a child's toy;

said vehicle having a frame member for transferring support and transporting motion for a supporting motion assembly in which the supporting motion assembly includes at least one wheel, said wheel is rotatable with respect to said frame member, said vehicle is capable of movement by means including said wheel, said amusement and safety alert accessory comprising:

accessory housing means for housing said amusement and safety alert accessory;

sound producing assembly means for producing sound when said sound producing assembly means is engaged with said wheel and said wheel is in rotation;

engaging and control assembly means for engaging and controlling the sound producing assembly means to engage with said wheel;

accessory mounting assembly means for mounting said amusement and safety alert accessory on said frame member;

wherein said sound producing assembly means has a striker noise making assembly adapted for use with spokes of said wheel, part of said striker noise making assembly moving when said wheel is in rotation and placed within a spoke path, said spoke path is defined by said wheel, wherein any combination or all of a plurality of separate and independently moveable strikers may be selected for placement within said spoke path to produce a sound when said wheel is in rotation.

* * * * *